United States Patent [19]

Kato et al.

[11] Patent Number: 4,472,748

[45] Date of Patent: Sep. 18, 1984

[54] METHOD OF PROCESSING INFORMATION SIGNAL WITH RESPECT TO OPTO-MAGNETIC RECORD MEDIUM

[75] Inventors: Kiichi Kato, Hachioji; Tsuneo Yanagida, Hino, both of Japan

[73] Assignee: Olympus Optical Co. Ltd., Japan

[21] Appl. No.: 336,319

[22] Filed: Dec. 31, 1981

[30] Foreign Application Priority Data

Jan. 9, 1981 [JP] Japan .................................... 56-1161

[51] Int. Cl.³ ............................................... G11B 5/02
[52] U.S. Cl. ....................................... 360/59; 360/114
[58] Field of Search .................... 360/59, 114; 369/13, 369/100

[56] References Cited

U.S. PATENT DOCUMENTS 3,778,791 12/1973 Lewicki et al. ........................ 360/59
3,876,842 4/1975 Bouwhuis ........................... 179/100
4,340,914 7/1982 Hanaoka ............................... 360/59

Primary Examiner—Vincent P. Canney
Attorney, Agent, or Firm—Parkhurst & Oliff

[57] ABSTRACT

In a method of recording an information signal in an opto-magnetic record disc which has an easily magnetizable axis perpendicular to its surface, a constant erasing light beam and a modulated recording light beam are focussed by a single objective lens on adjacent tracks and an external magnetic field is applied to the record medium. The erasing and recording operations can be carried out at the same time by inverting the polarity of the external magnetic field track by track.

16 Claims, 14 Drawing Figures

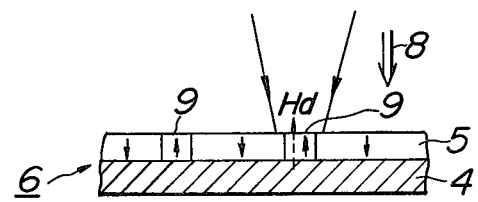
FIG._3A
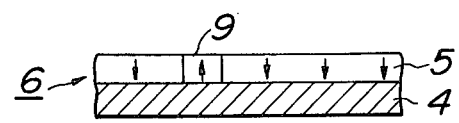
FIG._3B
FIG._4      FIG._5
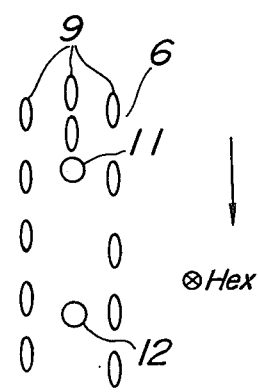
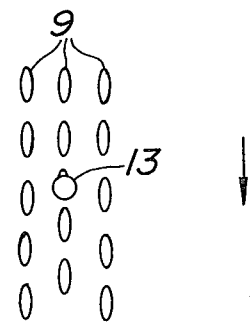

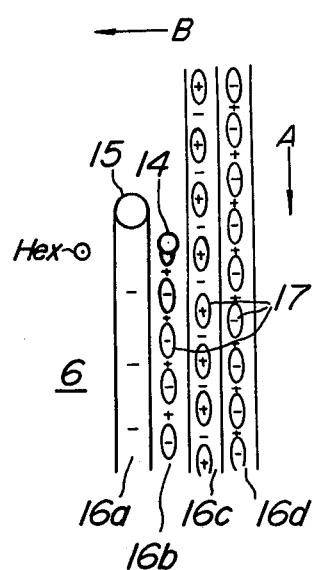
FIG_6
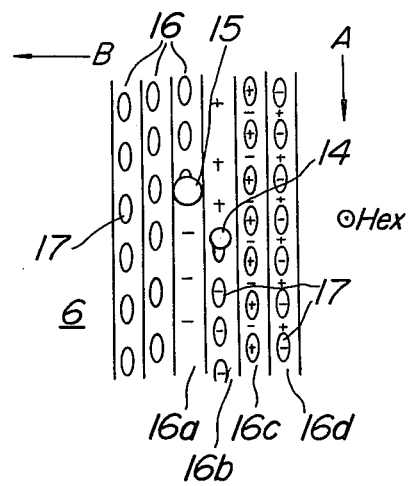
FIG_7
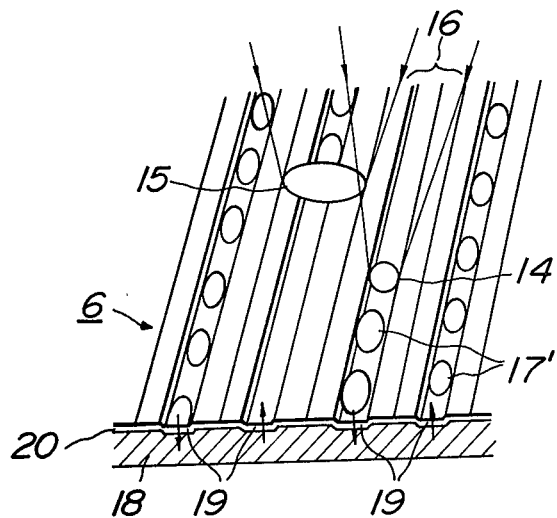
FIG_8

METHOD OF PROCESSING INFORMATION SIGNAL WITH RESPECT TO OPTO-MAGNETIC RECORD MEDIUM

BACKGROUND OF THE INVENTION

The present invention relates to a technique for recording, reproducing and erasing an information signal with respect to an opto-magnetic recording medium having a magnetic anisotropy perpendicular to its surface.

Nowadays, there has been developed an apparatus in which information can be recorded on and read out of a recording medium by means of a laser beam, said recording medium being formed by a magnetic film of two-phase amorphous alloy such as GdCo, GdFe, TbFe and DyFe and three-phase amorphous alloy such as GdTbFe. In case of recording, the magnetic film has been previously magnetized perpendicularly, for instance downward and the laser beam modulated with an information signal to be recorded is projected onto a given portion of the film so as to heat the related portion near a Curie point while the related portion is subjected to an external biassing magnetic field directing upward. Then the direction of magnetization in the relevant portion is inverted. Since the information can be recorded perpendicularly in the magnetic film, a very high recording density can be attained. In case of reproducing the information thus recorded in the recording medium, the laser beam is projected via a polarizer onto the medium and the reflected or transmitted laser beam is received by a photodetector via an analyzer. The polarization surface of the linearly polarized laser beam is rotated to some extent due to a magnetic Kerr effect or a magnetic Faraday effect in a direction depending upon the direction of magnetization at the read out portion of recording medium. By detecting the rotational direction of the polarization plane of the detected laser beam, the information can be read out. In such an opto-magnetic recording medium, not only the recording and reproducing, but also erasing can be effected and thus, the information can be rewritten just like in an ordinary magnetic recording medium such as magnetic tape, magnetic disc and floppy disc.

In one of the recording and/or reproducing method of the kind mentioned above, a laser light beam is projected onto a thin film of MnBi or rare earth element-iron group having Kerr effect, or rare earth garnet having Faraday effect, and a direction of magnetization in the recording medium is inverted by means of heat generated by the laser beam irradiation so as to record information. Such a method is superior to a method in which the information is permanently recorded on a surface of metal film by means of a series of holes or pits, because in the former method, the information can be rewritten repeatedly. Such a method can record and/or reproduce the information signal and is termed as opto-magnetic recording and/or reproducing method. However, in the known opto-magnetic method all the information recorded on the record medium must be erased at once by placing the record medium in a strong magnetic field and by subjecting the record medium to heat, if any. By means of such an erasing method it is difficult to erase a part of the recorded information and to record new information in the erased portion.

FIG. 1 is a schematic diagram showing one embodiment of the known method for recording information on an opto-magnetic record medium. A laser beam 1, modulated in accordance with an information signal to be recorded, is converged into a light spot 3 by means of an objective lens 2. Then the light spot 3 impinges on a record medium 6 which comprises a thin film 5 having an opto-magnetic effect applied on a substrate 4. When a temperature of the irradiated portion on the thin film 5 is increased higher than the Curie point, the direction of magnetization 7 in this portion is inversed by an external magnetic field 8 having a magnetizing direction opposite to that of a surrounding magnetization by a demagnetizing field produced by the surrounding magnetization, and then a series of bits 9 are formed on the record medium 6 corresponding to the information signal to be recorded.

Hereinafter, bit means a region which records a minimum unit of information and, if the information is analog data such as a video or an audio signal, the bit corresponds to a so-called pit.

The reproduction of the information recorded in this manner is performed by projecting a linearly polarized beam onto the record medium 6 and then detecting a rotation of a polarized surface of a light reflected from the record medium 6.

Next, a method of erasing the information recorded in this manner will be described. In case of erasing all the information recorded on the record medium 6, the record medium 6 on which the bits 9 are formed as shown in FIG. 2A is heated above the Curie point by means of a suitable heating means. At the same time, the external magnetic field 8 having a comparatively weak magnetic field or having a magnetic field above a coercive force Hc in case of no heating is applied to the record medium 6 so as to arrange the magnetizing direction on the record medium 6 the same as that of the external magnetic field 8 as shown in FIG. 2B, so that all the bits 9 recorded on the record medium 6 can be erased completely.

Moreover, in case of erasing the information recorded on the record medium 6 partly at random, the laser beam 1 is projected onto a given restricted portion of the bits as shown in FIG. 3A to heat the irradiated portion locally, and then the magnetization of the relevant portion is forcibly oriented in the same direction as that of the external magnetic field 8 having a magnetic force above that of a demagnetizing field Hd produced by the neighboring magnetization, so that the relevant portion of the bits 9 can be erased selectively as shown in FIG. 3B.

However, in an actual information recording and/or reproducing apparatus, it is convenient to perform the erasing and rewriting operations at the same time. A known method of performing the erasing and rewriting at the same time will be described with reference to FIG. 4. In FIG. 4, when the record medium 6 is moved in an the direction of the arrow direction, an erasing beam 11 scans a series of bits 9 to erase the information recorded on the record medium 6 in the same manner as shown in FIG. 3. It should be noted that the magnetizing direction of the bit is from back to front with respect to a plane of the drawing, and the external magnetic field Hex is applied in the direction opposite to that mentioned above. A numeral 12 shows a recording beam. In case of focussing the erasing beam 11 and recording beam 12 by means of only one objective lens, it is not possible to make the distance between these two beams large because of their aberrations, etc. The direction of the magnetic fields applied at the erasing beam spot and the recording beam spot have to be opposite to each other, and therefore if these magnetic fields are applied simultaneously under such a condition that the distance between the erasing beam and the recording beam is close, the effects of these beams would be cancel each other, so that it is not possible to record new information by the recording beam 12 while erasing the previous information by the erasing beam 11.

FIG. 5 shows another known method in which the erasing and recording are performed at the same time by varying the direction of the single magnetic field, while the single beam is projected on the record medium continuously. In this case, the irradiated portion of the record medium is heated above the Curie point by the laser beam 13. In this embodiment, when a recording signal is not supplied, the external magnetic field Hex having an amount larger than the coercive force Hc is applied. When the recording signal corresponding to the information to be recorded is supplied, the direction of the external magnetic field Hex is inverted at the same time, and then a recording operation can be performed by applying the external magnetic field having an amount smaller than the coercive force Hc at a room temperature. However, since it is difficult to make the inductance of a magnetic field generating coil small for carrying out the erasing and recording operations and since the inversion of the magnetic field is delayed if a coil having a large inductance is used, it is not possible to change the erasing and the recording operations rapidly by inverting the magnetic field in response to the information to be recorded which is supplied at a high speed.

As described above in detail, in a known opto-magnetic recording and/or reproducing method, it is not possible or at least very difficult to effect the erasing and rewriting operations at the same time.

SUMMARY OF THE INVENTION

The present invention has for its object to provide a novel and useful method of processing an information signal with respect to an opto-magnetic record medium, which method can obviate the above mentioned drawbacks and can effect erasing and rewriting operations by only one pick-up head.

According to the invention a method of processing an information signal with respect to an opto-magnetic record medium which has an easily magnetizable axis perpendicular to its surface, comprises generating an erasing light beam having a constant intensity;

generating a recording light beam having an intensity modulated with an information signal to be recorded;

focussing said erasing and recording light beams as light spots on portions of tracks which are spaced by at least one track to heat said portions;

applying an external magnetic field perpendicularly to said record medium; and inverting a polarity of said external magnetic field at a given track interval in such a manner that a magnetizing direction of the track on which said recording light beam is focussed is made opposite to that of the track erased by said erasing light beam; whereby erasing and recording operations are performed at the same time by means of said two light beams and said external magnetic field.

BRIEF DESCRIPTION OF THE DRAWINGS

FIGS. 3A and 3B are schematic views explaining a manner of erasing partly information recorded on an opto-magnetic record medium in the known method;

FIGS. 4 and 5 are schematic views explaining a manner of erasing and rewriting information at the same time in the known method;

FIGS. 6, 7 and 8 are schematic views showing one embodiment of an information recording and/or reproducing method using an opto-magnetic record medium according to the invention;

DESCRIPTION OF THE PREFERRED EMBODIMENTS

Figure 1:
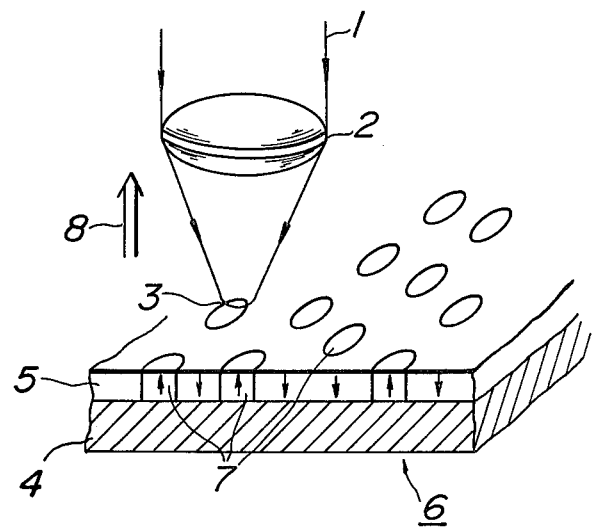
FIG. 1 is a perspective view explaining a manner of recording an information signal in a known information recording and/or reproducing method using an opto-magnetic record medium.
Figure 2A:
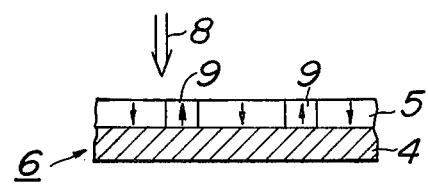
FIGS. 2A and 2B are schematic views explaining a manner of erasing all information recorded on an opto-magnetic record medium in the known method.
Figure 2B:
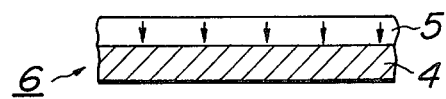

FIG. 6 is a schematic view showing a manner of erasing old information and recording new information on a new opto-magnetic record medium in the method according to the invention. In FIG. 6, a travelling direction of a record medium 6 is shown by an arrow A and a travelling direction of a pick-up head is denoted by an arrow B. A recording light beam 14 and an erasing light beam 15 are simultaneously focussed on the record medium at adjacent tracks 16b and 16a as light spots. The diameter of the erasing beam spot is slightly larger than that of the recording beam spot. It should be noted that the intensity of recording beam 14 is modulated with an information signal to be recorded, but the erasing beam has a constant intensity. An external magnetic field Hex is applied to a portion of the record medium 6 in which the recording and erasing light beams are projected. A polarity of the external magnetic field can be reversed track by track. Therefore, bits 17 in a recorded track 16c have magnetization having a direction opposite to that in the adjacent tracks 16b and 16d. In FIG. 6, a positive sign (+) indicates that the magnetization direction is back to front with respect to the plane of drawing and a negative sign (−) denotes the magnetization is in the front to back direction. Therefore, in the track 16a, the magnetization is wholly directed from front to back so as to effect the erasing and in the track 16b, the magnetization of parts which are irradiated by the recording beam 14 are selectively inverted so as to form the bits 17. The remaining portion in the track 16b has the magnetization direction from front to back. In this manner, by changing the polarity of the external magnetic field Hex track by track, it is possible to effect simultaneously the erasing and recording. According to the invention, since the recording and erasing beams 14 and 15 can be arranged closer to each other, they may be focussed by a single objective lens without causing a serious problem of aberration and thus, the pick-up head can be made small in size and light in weight. This is very advantageous for effecting necessary focussing and tracking control by moving the objective lens in its optical axis and a direction perpendicular to the optical axis. Further, the external magnetic field is sufficient to be inversed track by track and thus, the external magnetic field may be generated by a coil having a relatively large inductance.

FIG. 7 shows a manner of recording new information while erasing old information recorded previously. When a recording track 16a to be erased is scanned by the erasing beam 15, the previously recorded bits 17 on the track 16a are successively erased by the external magnetic field Hex having the magnetizing direction from front to back and a part of the track 16a which has been scanned by the erasing beam 15 has been magnetized in the same direction as that of the external magnetic field. In the next track 16b on which the recording beam 14 is focussed, new information bits 17 are successively formed by the cooperation of heat due to irradiation of the recording beam 14 and of the external magnetic field Hex. According to the invention, since it is sufficient to invert the direction of the applied magnetic field track by track, it is not necessary to modulate the external magnetic field at a high speed as in the case of the known method shown in FIG. 5 and thus, there is no problem of the inverting speed of the magnetic field irrespective of an amount of the inductance of the magnetic field generating coil.

Further, in the above explanation focussing and tracking controls of the beams are not described, but it is possible to apply a known controlling technique commonly used in a video disc player.

Furthermore, as for the tracking control, it is effective to use a pre-grooving method in which at least one standard track of phase construction has been formed previously on the record medium, for the sake of simplicity of a construction of an optical system.

FIG. 8 is a schematic view showing one embodiment using such a pre-grooving method. In this embodiment, guide recesses 19 are formed in a surface of a substrate 18 of the record medium 6, and a thin film 20 having an opto-magnetic effect is formed thereon. The erasing beam 15 is controlled to scan the guide recess 19 mentioned above by detecting a variation of a reflected light pattern. Also, in this embodiment, the information bit erasing and rewriting operations can be carried out by means of the same external magnetic field as that shown in the aforementioned embodiment. In FIG. 8, an arrow shows the magnetizing direction of each track.

Figure 9:
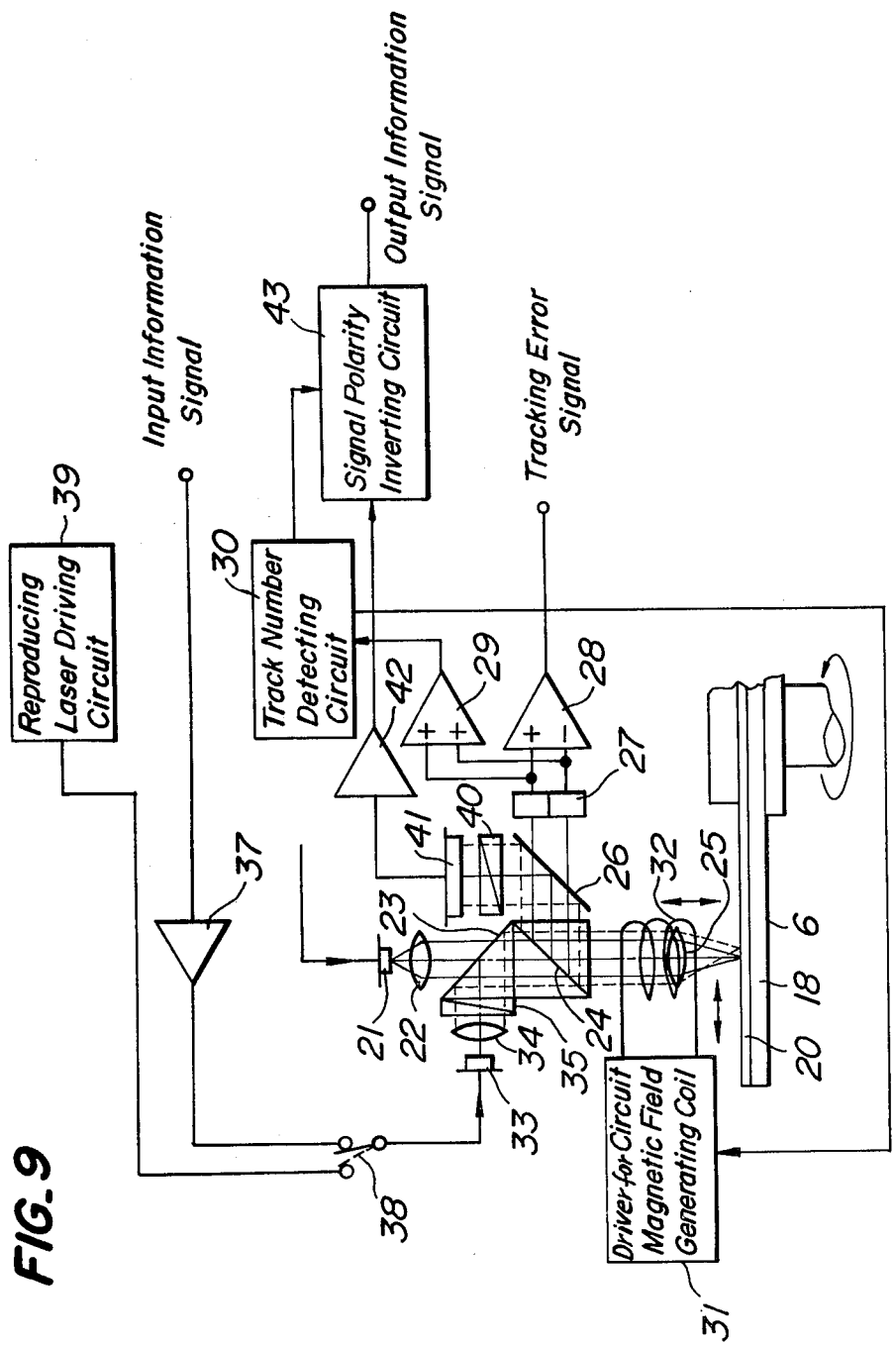
FIG. 9 is a block diagram illustrating an embodiment of an apparatus for carrying out the method according to the invention.

FIG. 9 is a schematic view illustrating one embodiment of an apparatus for carrying out the method of processing information with respect to the opto-magnetic record medium according to the invention. In this embodiment, the guide recesses have been formed on the record medium 6 in the same manner as that shown in FIG. 8, and mechanically recorded track numbers which could not be erased by the erasing beam have been formed on each tracks in the same manner as that of a recording information of the video disc, etc. In case of recording the information, the information signal is recorded on the thin film 20 having the opto-magnetic effect which is formed on a substrate 18 of the record medium 6. A light flux emitted from an erasing laser 21 is collimated by a collimator lens 22 and is focussed on the record medium 6 through a beam splitter 23 and a half mirror 24 by means of an objective lens 25. A part of a reflected light from the record medium is further reflected by the half mirror 24 and is made incident upon a detector 27 divided into two parts through a beam split 26. The detector 27 is splitted into two light receiving regions with respect to a surface perpendicular to the plane of drawing and including an optical axis of the reflected light flux from the record medium 6. Since bright and dark light patterns projected on the two light receiving regions are varied in response to a positional relation between the erasing beam and the guide recess unless a depth of the guide recess on the record medium 6 is not equal to an integer multiple of a quarter wavelength, a tracking error signal can be obtained by producing a difference of output signals from the two light receiving regions by means of a differential amplifier 28. Moreover, an output of an amplifier 29 which amplifies a sum of output signals from these two light receiving regions is supplied to a track number detecting circuit 30. Therefore the track number previously formed on the guide recess of the record medium 6 is read out by the circuit 30. As soon as the track number is read out in the circuit 30, a track number signal generated by the circuit 30 is supplied to a circuit 31 for driving a magnetic field generating coil 32 in such a manner that the direction of external magnetic field is inverted track by track in response to the track number signal mentioned above. On the contrary, a light flux emitted from a recording laser 33 is modulated by a laser driver 37 in response to the information signal to be recorded and the modulated beam is collimated by a collimator lens 34 and is linearly polarized by a polarizer 35 such as a Glan-Thomson prism. Followingly, this polarized light flux is reflected by the beam splitter 23 and is focussed by the objective lens 25 on a track which is one track behind with respect to the track on which the erasing beam is focussed.

Next, a case of reproducing the information recorded on the record medium 6 will be described. At first, a switch 38 is actuated in a position shown by a dotted line to drive the recording laser 33 at a low power continuously by an output of a reproducing laser driving circuit 39, and the light flux emitted from this laser 33 is collimated by the collimator lens 34 and is linearly polarized by the polarizer 35. Then, the polarized light flux is focussed on the record medium 6 through the beam splitter 23 and the objective lens 25, and the light flux reflected therefrom is made incident upon an analyzer 40 such as Glan-Thomson prism through the half mirror 24 and the beam splitter 26. Since the record medium 6 is magnetized in a direction perpendicular to the recording surface as mentioned above and the recording information is recorded in response to a difference of the magnetization, a polarized surface of the linearly polarized laser light flux impinging on the record medium 6 is rotated a little corresponding to the magnetizing direction of the irradiated portion on the record medium 6. This polarized light flux having a different rotating direction is converted into a difference of the light intensity in response to its rotating direction by means of the analyzer 40, and then impinges onto a light detector 41 which converts this light intensity into an electric signal. The electric signal obtained from the light detector 41 is amplified by an amplifier 42 and then is supplied to a signal polarity inverting circuit 43. In this signal polarity inverting circuit 43, a polarity of output signal supplied from the amplifier 42 is inverted track by track in response to the track number signal from the track number detecting circuit 30. Therefore, it is possible to obtain the information signal having the same polarity as that of the recorded information signal. Contrary to this, when the information signal has been recorded with its polarity being inverted track by track, the output signal from the amplifier 42 may be directly supplied as the reproduced signal as will be explained later. In case of reproducing the information recorded on the record medium 6, the magnetic field generating coil 32 is not driven. Moreover, as for the beam splitters 23, 26 various means such as a half mirror can be used, but if it is possible to vary a laser wavelength, a dichroic mirror may be advantageously used as the beam splitter so that an effective optical system can be constituted.

According to the present invention, it is possible to read out the information recorded on the record medium having no pre-groove as shown in FIGS. 6 and 7. Also in this case the polarity of the successively reproduced information signal may be inverse to that of the original information signal.

Figure 10:
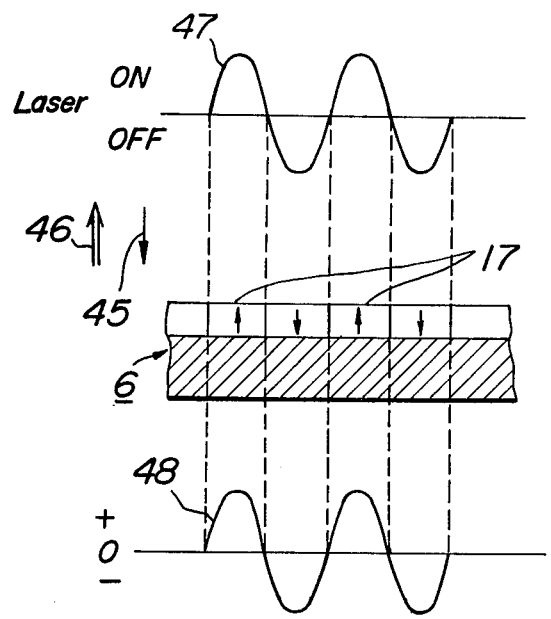
FIGS. 10 and 11 are schematic views explaining the operation of the apparatus shown in FIG. 9.
Figure 11:
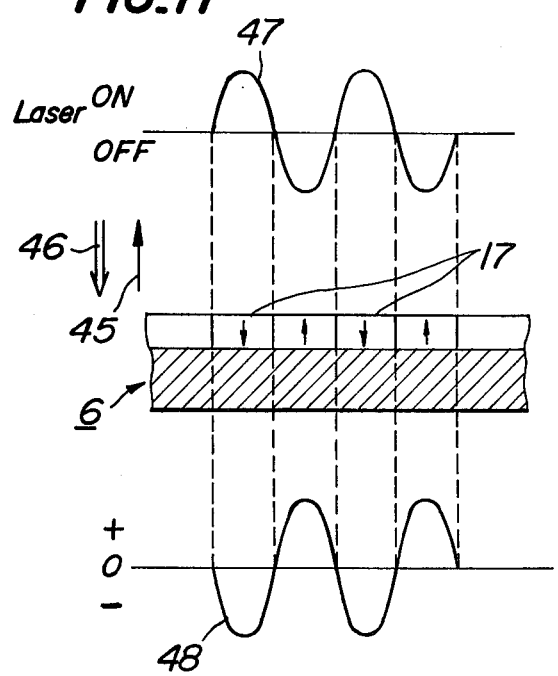

FIGS. 10 and 11 illustrate how to inverse the polarity of the reproduced information signal. In FIG. 10, the erased track has a magnetization directing downward as shown by an arrow 45 and then the external magnetic field has a direction upward as illustrated by an arrow 46. When a recording laser beam is modulated by an information signal 47 to be recorded, bits 17 having the magnetization directing upward are formed at those portions in the track which are irradiated by the laser beam. Now it is assumed that when the bits 17 with the upward magnetization are scanned by the reproducing beam, a positive signal is reproduced as shown in a reproduced signal 48. It is apparent that the reproduced signal has the same polarity as that of the input information signal. However, in FIG. 11, the directions of the magnetization of the erased track and the external magnetic field are opposite to those in FIG. 10. Then, the bits 17 have the downward magnetization and thus, in the reproduced signal 48, the corresponding signal has negative polarity which is opposite to that of the input information signal. In case of projecting the recording and erasing beams on successively adjacent tracks, the above mentioned two situations occur alternately track by track. In order to make the polarity of the reproduced signals coincide with the input signal, the following two measures can be taken. In a first method, the polarity of the input signal to be recorded is inversed track by track and in a second method, the polarity of the reproduced signal is inverted track by track. In the second method, a signal for identifying the polarity of the external magnetic field may be recorded separately from the information signal. Alternatively, it is possible to use the track number signal as said identifying signal as shown in FIG. 9.

Figure 12:
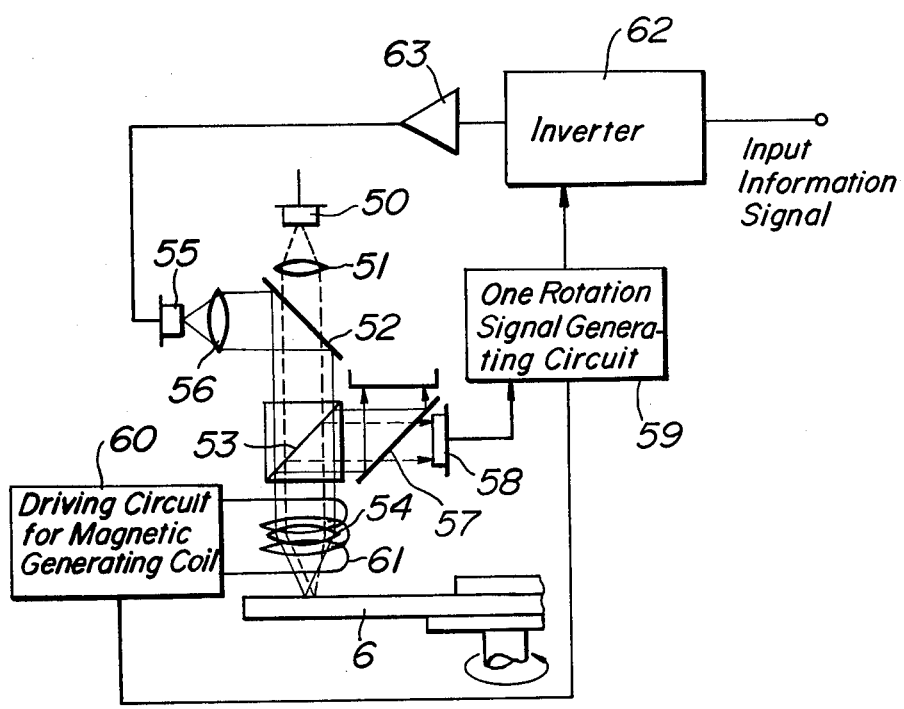
FIG. 12 is a block diagram showing another embodiment of the apparatus for carrying out the method according to the invention.

FIG. 12 is a schematic view illustrating one embodiment of an apparatus for carrying out the recording method according to the invention in which the information signal is recorded while being inverted track by track. A light flux emitted from an erasing laser 50 is collimated by a collimator lens 51 and then is focussed on the record medium 6 by an objective lens 54 through half mirrors 52, 53. Moreover, a light flux emitted from a recording laser 55 is collimated by a collimator lens 56 and then is focussed on the record medium 6 by the objective lens 54 through half mirrors 52, 53. A positional relation between the erasing and recording beams is the same as that described in the embodiment shown in FIGS. 6 and 7. A light flux of the erasing beam reflected by the record medium 6 is introduced to a light detector 58 via the objective lens 54 and half mirrors 53, 57. A signal for indicating one rotation i.e. one track which has been previously recorded on the record medium 6, is detected by the light detector 58 receiving the erasing beam. A detection signal obtained from the light detector 58 is supplied to a one rotation signal generating circuit 59 and then a switching signal is generated from the circuit 59 in response to the detection signal mentioned above. This switching signal is supplied to a driving circuit 60 for the magnetic field generating coil 61 and a signal inversion circuit 62. On supplying the switching signal to the driving circuit 60, a direction of an electric current supplied to the external magnetic field generating coil 61 is inverted. At the same time, a polarity of the information signal to be recorded is inverted by the signal inversion circuit 62, and then is supplied to a laser driver 63 so that the recording laser 55 is driven in response to the inverted information signal supplied from the laser driver 63. It should be noted that the signal for indicating one rotation may be derived by another means such as a rotary encoder arranged in a rotation system.

According to the invention, the erasing and recording operations can be effected at the same time effectively by means of a single pick-up.

The present invention is not limited to the above described embodiments, but various modifications and alternatives are possible. For example, in the embodiments mentioned above, the erasing and recording beams are spaced by one track and the inversion of the magnetic field is carried out track by track, but it is possible to space the erasing and recording beams by two or three tracks, and then the inversion of the magnetic field should be effected at a given interval corresponding to two or three tracks.

What is claimed is:

1. A method of processing an information signal with respect to an opto-magnetic record medium which has an easily magnetizable axis perpendicular to its surface, comprising:

generating an erasing light beam having a constant intensity;

generating a recording light beam having an intensity modulated with an information signal to be recorded;

focussing said erasing and recording light beams as light spots on portions of tracks which are spaced by at least one track to heat said portions;

applying an external magnetic field perpendicularly to said record medium; and inverting a polarity of said external magnetic field at a given track interval in such a manner that a magnetizing direction of the track on which said recording light beam is focussed is made opposite to that of the track erased by said erasing light beam so that erasing and recording operations are performed at the same time by means of said two light beams and said external magnetic field.

2. A method according to claim 1, wherein said erasing and recording light beams are projected on adjacent tracks and the polarity of external magnetic field is inverted track by track.

3. A method according to claim 1, wherein a diameter of said erasing beam is larger than that of said recording beam.

4. A method according to claim 1, wherein said erasing and recording light beams are generated from separate laser light sources.

5. A method according to claim 4, wherein said laser light source generating the recording light beam is modulated by the information signal to be recorded.

6. A method according to claim 5, wherein a polarity of said information signal is inverted in synchronism with the polarity inversion of said external magnetic field.

7. A method according to claim 1, further including the step of reproducing the recorded information signal comprising:

generating a reproducing light beam having a constant intensity; and focusing the reproducing light beam as a light spot on the track in which the information signal has been recorded.

8. A method according to claim 7, wherein said reproducing light beam is generated by a laser light source which also generates said recording light beam.

9. A method according to claim 7, wherein an inversion discriminating signal is recorded in response to each polarity inversion of said external magnetic field and the polarity of the reproduced signal is inverted in response to said inversion discriminating signal.

10. A method according to claim 1 or 7, wherein said opto-magnetic record medium includes a pre-grooved record medium having pre-grooved tracks.

11. A method of processing an information signal with respect to an opto-magnetic record medium which has an easily magnetizable axis perpendicular to its surface and pre-grooved tracks, comprising:

generating an erasing light beam having a constant intensity;

generating a recording light beam having an intensity modulated with an information signal to be recorded;

focusing said erasing and recording light beams as light spots on portions of tracks which are spaced by at least one track to heat said portions;

applying an external magnetic field perpendicular to said record medium;

inverting a polarity of said external magnetic field at a given track interval in such a manner that a magnetizing direction of the track on which said recording light beam is focused is made opposite to that of the track erased by said erasing light beam in such a manner that erasing and recording operations are performed at the same time by means of said two light beams and said external magnetic field;

generating a reproducing light beam having a constant intensity;

focusing the reproducing light beam as a light spot on the track in which the information signal has been recorded;

recording a track number mechanically in said pre-grooved track so as not to be erased by said erasing, recording and reproducing light beams;

detecting said track number by said erasing, recording and reproducing beams; and inverting the polarity of said external magnetic field in response to said detected track number.

12. A method according to claim 11, wherein the polarity of the information signal to be recorded is inverted in response to said detected track number.

13. A method according to claim 11, wherein the polarity of the reproduced information signal is inverted in response to said detected track number.

14. A method for processing information on an opto-magnetic record medium having an easily magnetizable axis perpendicular to its surface comprising:

forming a first erasing light beam having a constant intensity;

forming a second recording light beam;

focusing said first and second light beams on portions of separate tracks of said record medium to heat said portions;

modulating said second light beam with an information signal;

applying an external magnetic field having a controllable polarity perpendicularly to said record medium including said portions of said separate tracks;

relatively moving said record medium and said beams from track to track such that said recording light beam records information in a track erased by said erasing light beam; and inverting the polarity of said external magnetic field at such intervals during said moving so that a magnetizing direction of the portion of the track on which said second light beam is focused is opposite to that of the magnetizing direction of the same portion of the track erased by said first light beam such that erasing and recording operations can be performed simultaneously.

15. The method of claim 14 wherein said focusing step comprises focusing said first and second light beams on portions of adjacent tracks and wherein said step of applying comprises applying a single external magnetic field simultaneously to said adjacent tracks and further wherein said inverting step comprises inverting said polarity upon movement of said second light beam from one track to the next.

16. An apparatus for processing an information signal on an opto-magnetic record medium which has an easily magnetizable axis perpendicular to its surface and records information in a plurality of tracks, comprising:

means for generating an erasing light beam having a constant intensity;

means for generating a recording light beam;

means for modulating said recording light beam with an information signal;

means for simultaneously focusing said erasing and recording light beams on portions of separate tracks of a record medium to heat said portions;

means for applying an external magnetic field of a selected polarity perpendicular to said portions of the tracks of said record medium;

means for moving said erasing and recording light beams from track to track such that said recording light beam records information in a track erased by said erasing light beam; and means for inverting the polarity of said external magnetic field in response to movement of said light beams between said tracks in such a manner that a magnetizing direction of the track on which said recording light beam is focused is made opposite to the magnetizing direction of the same track by said erasing light beam such that erasing and recording operations are performed simultaneously.

* * * * *